Aug. 17, 1965  F. O. JOHNSON  3,201,725
COUPLING MEANS
Filed Dec. 17, 1962
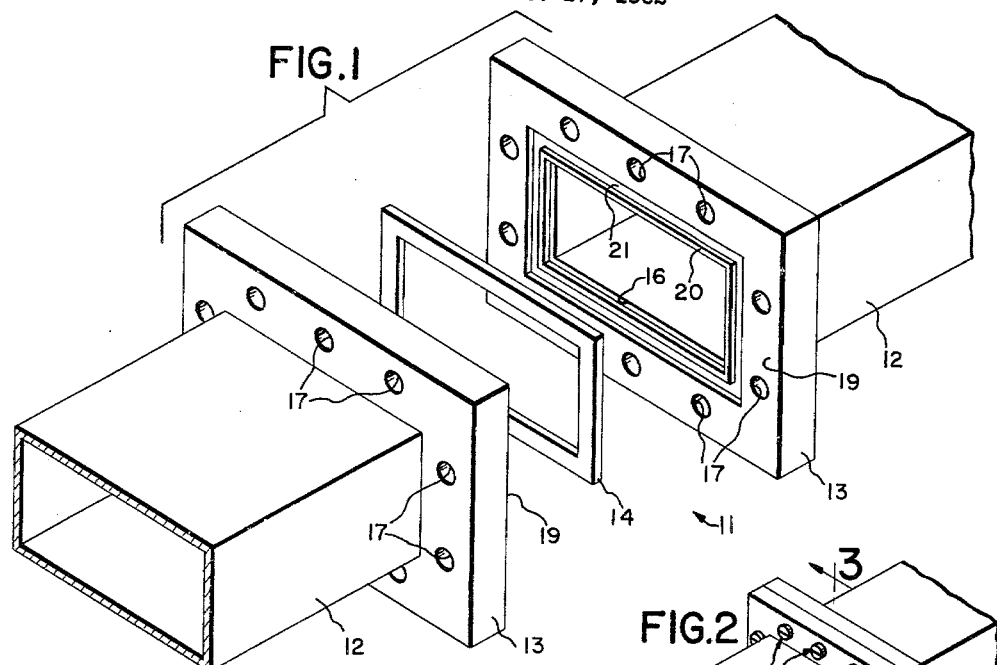
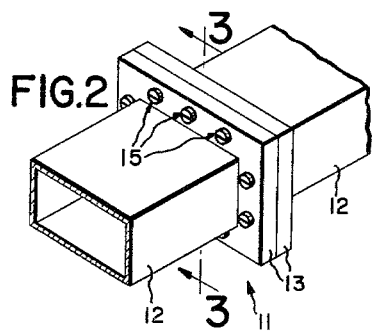
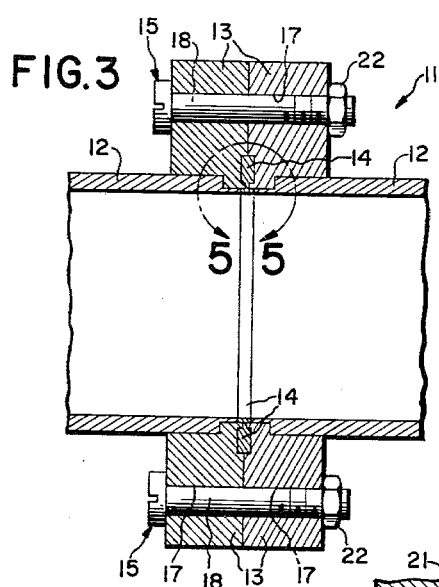
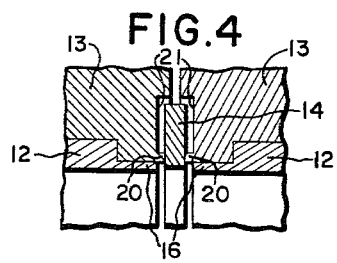
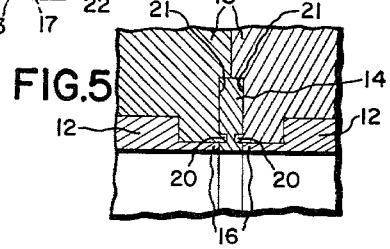
INVENTOR.
FLOYD O. JOHNSON
BY *Wm. J. Nolan*
ATTORNEY

United States Patent Office 3,201,725
Patented Aug. 17, 1965

3,201,725
COUPLING MEANS
Floyd O. Johnson, Mountain View, Calif., assignor to Varian Associates, Palo Alto, Calif., a corporation of California
Filed Dec. 17, 1962, Ser. No. 245,068
2 Claims. (Cl. 333—98)

This invention relates to coupling means and in particular to a vacuum-tight, pressure-tight and electrically continuous means for joining waveguide sections.

Generally, when it is desired to join waveguide sections, mating flanges are soldered or brazed to the ends of the sections to be joined. The faces of the flanges are grooved so as to receive a gasket of softer material, as, for example, copper or rubber, placed between the faces. The flanges are clamped together by a conventional bolt and nut arrangement, and at the same time a seal is accomplished at the interface between the flange faces and the softer gasket material.

Under ordinary conditions, the presently available coupling means have been found to be responsible for a higher voltage standing wave ratio, higher losses and electrical discontinuity along the inner surface of the waveguide system, resultant change in impedance across the coupling means and reflection of power back to the input. Moreover, presently available couplings cannot withstand bakeout, nor can they withstand very high R.F. power requirements without breakdown.

Accordingly, it is the object of this invention to provide a vacuum-tight, pressure-tight and electrically continuous low loss waveguide coupling means having a low voltage standing wave ratio which may withstand repeated cooling and bakeout and which can withstand very high R.F. power requirements without breakdown.

One feature of the present invention is the provision of an all metal waveguide coupling means.

Another feature of the present invention is the provision of an all metal coupling means in which a seal is made along the inner surface of the waveguide sections to be joined.

Still another feature of the present invention is the provision in a waveguide coupling means of a reusable, sexless flange.

These and other objects and features of the present invention and a fuller understanding of the invention may be had by referring to the following description and claims, taken in conjunction with the following drawing in which:

FIG. 1 is an exploded perspective view of a preferred embodiment of the subject invention;

FIG. 2 is a perspective view of a preferred embodiment of the subject invention in clamped position;

FIG. 3 is a sectional view taken along lines 3—3 of FIG. 2 in the direction of the arrows;

FIG. 4 is a fragmentary sectional view of the sealing means of the subject invention before clamping; and FIG. 5 is a fragmentary sectional view of the area delineated in 5—5 of FIG. 3.

Referring to FIGS. 1 and 2 there is shown in partial assembly and complete assembly, the waveguide coupling means 11 of the subject invention including the waveguide sections 12 to be joined, flange members 13 for joining the waveguide sections, the copper gasket 14 for creating a seal at the inner surface of the waveguide sections and a nut and bolt assembly 15 for clamping the coupling means 11 together.

Each waveguide section 12 is of rectangular cross section, and is generally made of copper because of its good electrical properties, or brass. As more clearly seen in FIGS. 4 and 5 the ends to be joined are milled around the outside leaving a flat and smooth reduced waveguide end 16 extending outwardly along the inner surface of the waveguide section.

The flange members 13 of the subject invention are shown to be of rectangular cross section though the invention would be applicable to waveguide sections of any cross sectional configuration, and are usually constructed of stainless steel material. Using stainless steel allows the flange members 13 to be used repeatedly without deforming so that even after several uses there is no danger that the flange members will not make a tight fit. The flange member 13 is provided with a plurality of holes 17 which accommodate a plurality of bolts 18 made of, for example, stainless steel. Projecting beyond the end 16 of waveguide 12 is a tongue 20 of rectangular cross section (see FIGS. 4 and 5). The face 19 of the flange member 13 and tongue 20 are cut or machined so as to provide a gasket groove 21 of generally rectangular cross section which serves to partially contain a copper gasket 14.

The copper gasket 14, likewise, is rectangular and of rectangular cross section, though its cross sectional area is intentionally made larger than the gasket groove 21 in the face of the flange members 13.

The waveguide sections 12 are coupled together as follows. Identical flange members 13 are fitted on and brazed to the ends of the waveguide sections, with the main body of the flange member in tight communication with the waveguide section, and tongue 20 in vacuum-tight and pressure-tight communication with reduced waveguide end 16. Copper gasket 14 is placed between the opposing faces 19 of flange members 13 and is partially received within the gasket grooves 21 in the faces of the flange members (see FIG. 4). Bolts 18 are placed within the bolt holes 17, and the flange members 13 clamped together by means of tightening nuts 22 made of, for example, stainless steel. As the flange members 13 are drawn closer together, the oversized gasket 14 expands, and its size can be so selected that when the flange member faces meet, the copper gasket 14 will have completely filled the gasket grooves 21 and will just be flush with the inner surface of the waveguide sections 12 so as to create a vacuum-tight and pressure-tight seal there, and so as to form a continuous copper path along the waveguide system (see FIGS. 3 and 5).

This coupling means has the following advantages. The gap along the inner surface of the waveguide system and between adjoining sections is kept to a minimum. The gap is completely filled by a copper gasket which creates a seal at the inner surface along the waveguide section. A wave traveling down the system sees only a continuous, smooth copper path along the inner surface of the waveguide. Hence there is no change in impedance or reflection of power back to the input from the coupling means. With the all metal construction and with all parts having nearly the same coefficient of expansion, the coupling means may be subjected to repeated bakeout and cooling, and without losing its sealing properties. With such a construction very high power requirements can be met without breakdown.

In actual practice copper waveguide sections were used having an outside width of 3.660 inches and height of 1.960 inches. The waveguide wall was .125 thick. The ends to be joined were milled leaving a reduced waveguide and extending outwardly .19 inch long and .021 inch thick. 304 stainless steel was used for the flange member material as its coefficient of thermal expansion most closely coincided with that of the copper waveguide sections and gasket. The gasket groove was .025 inch deep and .233 inch wide, though in some instances the depth tapered from .025 to .010 inch. The inner edge of the groove was .019 inch from the edge of the flange. A copper gasket .04 inch thick and .021 wide was used. The stainless steel flange members were brazed to the ends of the waveguide sections to be joined with the main body of the flange member in tight communication with the waveguide section, and the tongue in vacuum tight and pressure tight communication with the reduced waveguide end. Clamping of the flange members together caused the oversized gasket to expand and just become flush with the inside surface of the waveguide sections. The coupling means was tested and found able to maintain vacuum conditions down to $10^{-8}$ torr, and withstand pressures up to several atmospheres. Repeated heating to 500° C. and cooling had no apparent effect on sealing properties. Power of 225 million watts was transmitted before breakdown occurred. The voltage standing wave ratio was practically unity, with no apparent change in impedance across the coupling means and no more losses across the coupling means than anywhere else along the waveguide system.

Although the invention has been described in its preferred form with a certain degree of particularity it is understood that the present disclosure of the present form has been made only by way of example and that numerous changes in the details of construction and the combination and arrangement of parts may be resorted to without departing from the spirit and the scope of the invention as hereinafter claimed.

What is claimed is:

1. A coupling means for joining together in a vacuum-tight, pressure-tight and electrically continuous manner two waveguide sections having reduced waveguide ends, said sections and ends having outer and inner peripheries forming outer and inner surfaces, the inner peripheries of said sections and said ends being in alignment, comprising a flange member made of rigid material having a tongue projecting outwardly beyond said reduced waveguide end, said flange member fixedly mounted on the outer surface of each reduced waveguide end, said waveguide ends being reduced such that said flange member tongues lie closely adjacent the inner surfaces of said waveguide sections without weakening said waveguide sections, a compressible bakeable washer having an inner periphery conforming to and initially slightly greater than the inner periphery of said reduced waveguide ends disposed between said flange members, and means for clamping said flange members together such that the inner periphery of said compressible washer is brought into alignment with the inner peripheries of said reduced waveguide ends so as to create a seal and form an electrically continuous path between said sections along said inner peripheries.

2. A coupling means for joining together in vacuum-tight, pressure-tight and electrically continuous manner two waveguide sections having reduced waveguide ends, said sections and ends having outer and inner peripheries forming outer and inner surfaces, the inner peripheries of said sections and said ends being in alignment, comprising a flange member made of rigid material fixedly mounted on the outer surface of each reduced waveguide end, being provided with facing surfaces having a groove therein formed to provide a gasket receiving means therebetween and a tongue at the inner end of said recess extending beyond said reduced waveguide end, said waveguide ends being reduced such that said flange member tongues lie closely adjacent the inner surfaces of said waveguide sections without weakening said waveguide sections, a compressible bakeable washer disposed between the said facing surfaces having an inner periphery conforming to and initially slightly greater than the inner periphery of said reduced waveguide ends and adapted to be partially contained within said gasket receiving means, and means for clamping said flange members together such that the inner periphery of said compressible washer is brought into alignment with the inner peripheries of said reduced waveguide ends so as to create a seal and form an electrically continuous path between said sections along said inner peripheries.

References Cited by the Examiner

UNITED STATES PATENTS

| | | | |
|---|---|---|---|
| 906,761 | 12/08 | White | 277—236 |
| 1,258,166 | 3/18 | Vollmann | 285—336 |
| 2,930,008 | 3/60 | Walsh | 333—98 |
| 2,955,857 | 10/60 | Smith | 333—98 |

HERMAN KARL SAALBACH, *Primary Examiner.*